United States Patent
Zabrosky (10) Patent No.: US 9,943,914 B2
(45) Date of Patent: *Apr. 17, 2018

(54) DRILLING SYSTEM FOR DEEP HOLES

(71) Applicant: Allied Machine & Engineering Corp., Dover, OH (US)

(72) Inventor: Jared R. Zabrosky, New Philadelphia, OH (US)

(73) Assignee: ALLIED MACHINE & ENGINEERING CORP., Dover, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,881

(22) Filed: Nov. 15, 2016

(65) Prior Publication Data

US 2017/0056984 A1    Mar. 2, 2017

Related U.S. Application Data

(63) Continuation of application No. 13/787,338, filed on Mar. 6, 2013, now Pat. No. 9,498,829.

(51) Int. Cl.
*B23B 51/02* (2006.01)
*B23B 51/04* (2006.01)
(Continued)

(52) U.S. Cl.
CPC ...... *B23B 51/0493* (2013.01); *B23B 51/0054* (2013.01); *B23B 51/02* (2013.01);
(Continued)

(58) Field of Classification Search
CPC ..... B23B 51/0493; B23B 51/02; B23B 51/06; B23B 51/0054; B23B 2260/124; B23B 2240/04; B23B 2251/02
See application file for complete search history.

(56) References Cited

U.S. PATENT DOCUMENTS 4,632,609 A * 12/1986 Johne ................ B23B 29/03407
407/31
6,012,881 A   1/2000 Scheer
(Continued)

FOREIGN PATENT DOCUMENTS

DE         94340      9/1896
DE        4015514    12/1990
(Continued)

OTHER PUBLICATIONS

European Patent Office, International Search Report/Written Opinion, dated Jun. 24, 2014, 13 pages.
(Continued)

*Primary Examiner* — Daniel Howell
*Assistant Examiner* — Paul M Janeski
(74) *Attorney, Agent, or Firm* — Hahn Loeser + Parks LLP; Scott M. Oldham, Esq.

(57) ABSTRACT

The invention is directed to a drill system that better uses the power curve of modern machine tools. The drill system uses IC inserts to perform the major hole diameter cutting, and a central drilling system that cuts the remaining minor diameter portion of the hole, and is configured to see less cutting surface footage, due to its position from the rotating center of the tool. A connection between the drill head and a holder body secures the drill head in a manner to effectively absorb lateral drilling forces. The drill system allows for a large diameter deep hole that remains straight throughout to be drilled at higher speed and lighter feed rates thus offering a more productive tool that takes advantage of the power curves and lower thrust capabilities of modern machine tools.

20 Claims, 5 Drawing Sheets

(51) Int. Cl.
*B23B 51/00* (2006.01)
*B23B 51/06* (2006.01)

(52) U.S. Cl.
CPC ........ *B23B 51/06* (2013.01); *B23B 2200/208* (2013.01); *B23B 2205/04* (2013.01); *B23B 2231/0268* (2013.01); *B23B 2240/04* (2013.01); *B23B 2250/12* (2013.01); *B23B 2251/02* (2013.01); *B23B 2251/50* (2013.01); *B23B 2260/124* (2013.01); *Y10T 408/455* (2015.01); *Y10T 408/5583* (2015.01); *Y10T 408/89* (2015.01)

(56) References Cited

U.S. PATENT DOCUMENTS

| | | | |
|---|---|---|---|
| 6,059,492 | A | 5/2000 | Hecht |
| 6,485,235 | B1 | 11/2002 | Mast et al. |
| 6,984,094 | B2 | 1/2006 | Nuzzi et al. |
| 7,201,542 | B2 | 4/2007 | Fritsch et al. |
| 7,309,196 | B2 | 12/2007 | Ruy Frota de Souza |
| 7,556,458 | B2 | 7/2009 | Heilmann et al. |
| 7,575,400 | B2 | 8/2009 | Kruszynski et al. |
| 7,717,654 | B2 * | 5/2010 | Cirino .................... B23B 51/02 408/226 |
| 7,972,094 | B2 | 7/2011 | Men et al. |
| 8,317,438 | B2 | 11/2012 | Mergenthaler |
| 8,376,669 | B2 | 2/2013 | Jaeger et al. |
| 8,419,322 | B2 | 4/2013 | Hodza et al. |
| 8,449,227 | B2 | 5/2013 | Danielsson |
| 8,721,235 | B2 | 5/2014 | Kretzschmann et al. |
| 9,498,829 | B2 | 11/2016 | Zabrosky |
| 2011/0097168 | A1* | 4/2011 | Jager ....................... B23B 51/02 408/200 |
| 2011/0250028 | A1 | 10/2011 | Zimmerman et al. |
| 2012/0134759 | A1 | 5/2012 | Jaeger et al. |
| 2013/0202376 | A1* | 8/2013 | Meyer .................... B23B 51/02 408/203 |

FOREIGN PATENT DOCUMENTS

| | | |
|---|---|---|
| JP | 2003-285214 | 10/2003 |
| JP | 2004276136 | 10/2004 |
| JP | 2009530117 | 8/2009 |
| JP | 2011-005632 | 1/2011 |
| RU | 2215620 | 11/2003 |
| RU | 2448815 | 4/2012 |
| RU | 2467837 | 11/2012 |
| SU | 814592 | 3/1981 |
| WO | 02076661 | 10/2002 |

OTHER PUBLICATIONS

Russian Federal Service for Intellectual Property, Official Action (translated), dated Jan. 25, 2017, 5 pages, Moscow, Russia.
Korean Intellectual Property Office, Notice of Refusal Ground, dated Mar. 13, 2017, 16 pages, Korea.

* cited by examiner

DRILLING SYSTEM FOR DEEP HOLES

CROSS REFERENCE TO RELATING APPLICATION

This application is a continuation of and claims priority to U.S. application Ser. No. 13/787,338 filed on Mar. 6, 2013. The contents of the foregoing application is incorporated by reference in its entirety.

BACKGROUND OF THE DISCLOSURE

In deep hole drilling systems, modern machine tools have led to the need for tooling that can effectively produce holes with a large depth to diameter ratio.

For making large diameter deep holes, the tooling that has been used does not account for using modern machine tools with less available horsepower. The machine tools that are found in use today generally have less available horsepower and can only reach that available peak horsepower at high spindle speeds. Conventional deep hole drilling may utilize double effective cutting geometry where both edges share an equal amount of the cutting load. This type of geometry allows for a drill to establish a centerline and act as a guide for the rest of the drill body following it. This enables longer drill bodies to drill straighter holes without leading off of centerline. In order to achieve chip formation in a way that chip evacuation at depth is manageable, these types of drill would need to be run at heavy feed rates in order to segment the chips. Furthermore, the drill would require being rotated at a relatively low spindle speed to manage the heat at the OD of the tool.

Another style of deep hole drilling that may be utilized is single effective gun drills or ejector head drilling tools. These types of tools are more suited to higher depth to diameter ratios and often require special machines and set-ups to be effective. These types of tools may also utilize a bearing surface on the tool body to attempt to provide stability to the front of the drill by making contact with the inside wall of the hole just previously drilled. This technology is widely used throughout the industry to attempt to provide stability to longer drills or to attempt to keep them drilling on center. It would be desirable to provide tooling that allows simple and flexible set-ups and use of standard machine tools.

Attempts to use a large spade blade to drill deep holes have also been pursued. However, these tools run at lower speeds and higher feed rates. Lower speeds mean that the machine is operating at the lower portion of the machines power curve. Higher feed rates require more thrust which may not be available on modern drilling machines. Indexable Carbide (IC) drills may be used to drill holes at high spindle speeds and lesser feeds. An IC drill will consume less thrust and will run at the higher end of the power curve relative to a spade drill of the same diameter. However at depths greater than 4× Diameter, IC drills lack stability and tend to lead off center which produces a hole that may not meet straightness requirements. Indexable inserts are available in various shapes and have the ability to be rotated (or indexed) to a fresh cutting edge when worn, and eventually replaced. This offers the ability to reuse the tool body any number of times by replacing the worn inserts. The drill body includes pockets to position the inserts by means of a screw or mechanical clamping mechanism. The position of the pocket on the cutting end of the drill body determines the size of the hole to be drilled. These types of drills are considered single flute effective, meaning that the inserts overlap. One insert cuts a portion of the diameter from the major diameter in towards the centerline and the other inserts cut the remaining portion from the centerline out to the point where it overlaps with the other insert.

There is a need to provide tooling that allows for utilizing the power curve of the modern machine tools, while accommodating the desire to drill at higher speed rates and lighter feed rates, but ultimately higher penetration rates.

SUMMARY OF THE DISCLOSURE

The invention is therefore directed to a drill system that better uses the power curve of the modern machine tools. The drill system uses a two-step drill, utilizing IC inserts to perform the major hole diameter cutting, and a central drilling system. In examples, the IC inserts can be set in a drill head in a single or double effective configuration. A central drilling system cuts the remaining minor diameter portion of the hole, and is configured to see less cutting surface footage, due to its position from the rotating center of the tool. The central drilling system may include a "self-centering" geometry, such that the drill head of the tool with be guided throughout the depth of the hole. The drill system allows for a large diameter deep hole that remains straight throughout to be drilled at higher speed and lighter feed rates thus offering a more productive tool that takes advantage of the power curves and lower thrust capabilities of modern machine tools.

In another aspect of the drilling system, both the indexable IC inserts and central drilling system provide the flexibility of being able to have different cutting geometries to suit a users application, with various options available with the IC inserts and central drilling system. Each geometry can be suited to a specific material and/or application, thereby increasing the effectiveness of the system. In another aspect, additional economy and flexibility may be provided by a range of fixed diameter heads that fit on the same holder body, which provide the user the ability to drill multiple sized holes without the purchase of additional holder bodies.

A drilling system according to an example of the present invention is disclosed comprising a holder body and a drill head attachable to the holder body, with the holder body having a first mating surface. The drill head in turn has a second mating surface that engages the first mating surface of the holder body. One of each of the first and second mating surfaces include at least one dovetail protrusion and at least one dovetail groove respectively. In a further example, a plurality of dovetail protrusions and a plurality of dovetail grooves may be used, each of which is formed in a rotational pattern about the center axis of the tool. A central positioning system may be provided to allow alignment of the drill head to the holder body. The drill head is assembled to the holder body rotating the drill head about the axis of the tool, in the direction of tool rotation (clockwise), until the at least one dovetail protrusion engages with the at least one dovetail groove and locks the drill head into place in association with the holder body.

In an example, the at least one dovetail protrusion and groove are together designed to absorb the cutting forces during a drilling operation in two directions. The first and second mating surfaces of drill head and holder body together translate the axial force from drill head to body. The at least one dovetail groove and dovetail protrusion formed on one of the first and second mating surfaces respectively include surfaces that translate the rotational force from drill head to the holder body. These surfaces of the at least one dovetail groove and dovetail protrusion may be angled to oppose lateral loads from drilling forces.

DETAILED DESCRIPTION OF THE DRAWINGS

Figure 1:
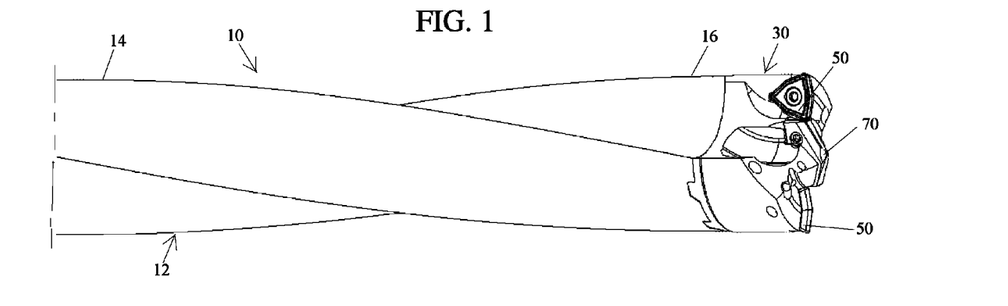
FIG. 1 is a partial perspective view of a drilling system according to an example of the present disclosure.

Referring now to FIG. 1, an example of the drilling system 10 of the invention may include a holder body 12 with shank end 14 to connect with the machine tool and a head end 16. The length of this body 12 will be the determining factor of the depth of hole to be drilled. In the example shown, the holder body has two flutes to evacuate chips of material from the double effective cutting geometry of the drill head 30. The drill head 30 in this example is assembled to the end of the holder body 12. The drill head 30 supports and positions a plurality of indexable inserts 50 and a central drilling system 70, that together perform the cutting action. Drill heads 30 of different major diameter and cutting configurations can be assembled to the holder body 12, allowing for significant flexibility in allowing different cutting geometries to suit the application. Both the inserts 50 and central drilling system 70 can be changed out of the drill head 30 based on the materials and/or application of the user. The replaceable nature of the indexable inserts 50 and the central drilling system 70 that can be assembled to the drill head 30 allow the user to specify the type of geometry to be used in each insert based on the application. Each geometry can be suited to a specific material and/or application thereby increasing the effectiveness of the system 10. Additionally, further economy and flexibility is provided by having a range of fixed diameter drilling heads 30 that fit on the same holder body 12, to provide the user the ability to drill multiple sized holes without the purchase of additional bodies.

Figure 2:
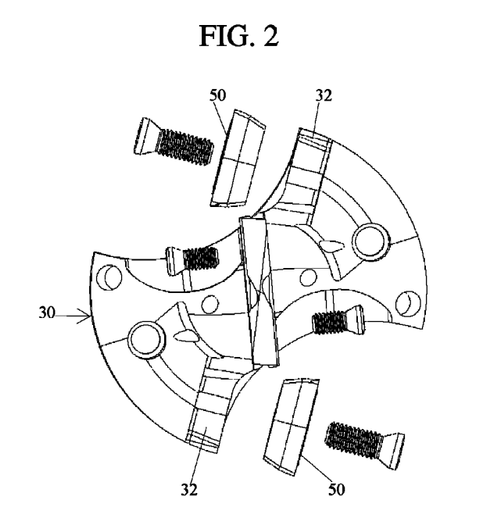
FIG. 2 is an exploded top elevational view of the drilling head associated with the drilling system.
Figure 3:
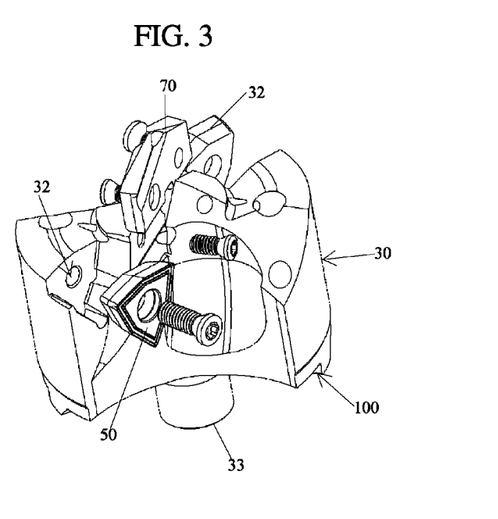
FIG. 3 is an exploded perspective view of the drilling head of FIG. 2.
Figure 4:
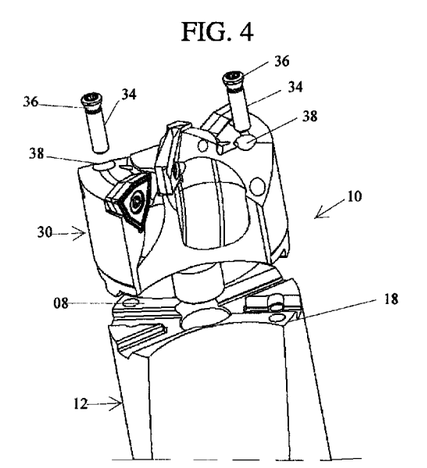
FIG. 4 is an exploded perspective view of the drilling head and holder body of the drilling system.
Figure 5:
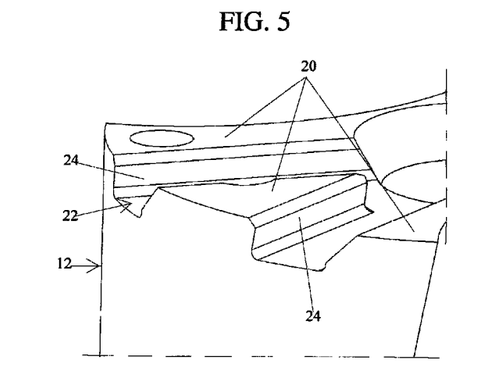
FIG. 5 is a partial perspective view of the top surface of the holder body of this example of the drilling system.
Figure 6:
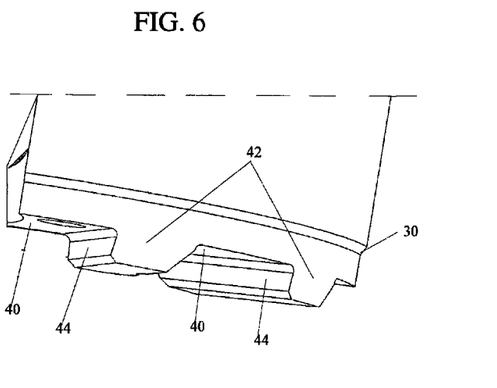
FIG. 6 is a partial perspective view of the bottom surface of the drilling head of this example of the drilling system.

To further refine the system 10 in this example, the drill heads 30 are made to fit like sized bodies 12 with a predetermined interface 100 designed for that drill diameter range. As seen in FIGS. 2 and 3, all IC cutting inserts 50 as well as the central drilling system 70 are assembled to the drill head 30. The central drilling system 70 can be a replaceable blade style or replaceable tip drill style, and is assembled with the mechanical means of assembly for that style and having the features to locate the central drilling system 70 in a predetermined position as part of the drill head 30. The drill head 30 further includes pockets 32 to position the IC inserts 50 in the proper position to perform the major diameter cutting. The IC inserts 50 may mechanically fastened into the pockets 32 in precise position for cutting the outside diameter of the desired hole. The drill head 30 may include a center guide post 33. In an example, the drill head 30 is then assembled to the body 12 and fastened using torx driven screws 34 with conical shaped heads 36, as shown in FIG. 4. The axis of the mounting screw hole 18 in the holder body is designed to line up with the axis of the mounting screw hole 38 in the drill head in such a way that, when tightened, the conical seat of the screw head 36 will influence the drill head 30 to rotate about its center axis in the direction of tool rotation until the connection 100 engages the holder body 12.

Figure 7:
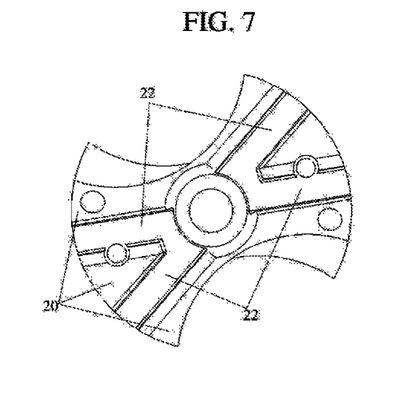
FIG. 7 is a top view of the top surface of the holder body of this example of the drilling system.
Figure 8:
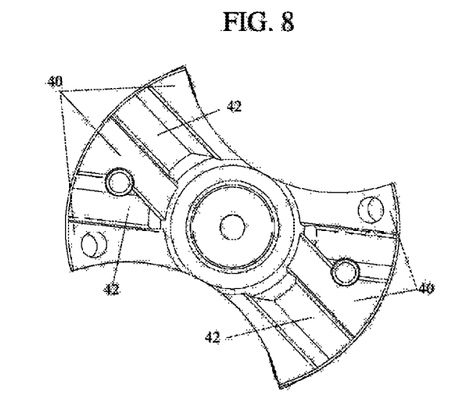
FIG. 8 is a bottom view of the bottom surface of the drilling head of this example of the drilling system.

Referring to FIGS. 5-8, the connection 100 between drill head 30 and body 12 is shown in more detail, and is designed to connect the drill head 30 and body 12 in a manner to more effectively absorb the cutting forces during a drilling operation, and more particularly, the cutting forces in two directions. As seen in FIGS. 7 and 8, the surface that translates the axial force from drill head 30 to body 12 is the flat face 20 of the body 12, and the flat surface 26 on the bottom of the drill head 30. In the surface 20 of the body 12, dovetail grooves 22 are formed and correspondingly, dovetail protrusions 42 are formed in the drill head 30. The surfaces that translate the rotational force from drill head 30 to body 12 are the faces 24 of the dovetail grooves on the body 12 and the faces 44 of the dovetail protrusions 42 on the drill head 30. In this example, at least one dovetail groove 22 and at least one dovetail protrusion 42 may be provided, and a plurality of dovetail grooves 22 and dovetail protrusions 42 may be used as shown, disposed on opposing sides of the mating surfaces 20 and 40. It may be possible to form the dovetail groove(s) 22 and/or dovetail protrusion(s) 42 on either one of mating surfaces 20 and 40. In the example, symmetrical positioning of the grooves and protrusions is shown, providing balanced and effective absorption of the drilling loads. On each side of the interface 100, there may be provided two grooves 22 on the body 12 and two interfacing protrusions 42 on the drill head 30. All other surfaces of this interface are clearance. The interface of this example connection 100 is symmetrical which will allow for the head to be assembled successfully at 180° increments or other suitable increments for example.

Figure 9A:
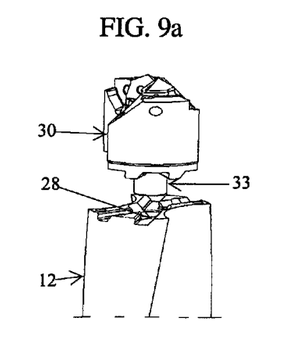
FIGS. 9a-9d show partial perspective views of the connection and assembly between the drill head and holder body of this example of the drilling system.
Figure 9B:
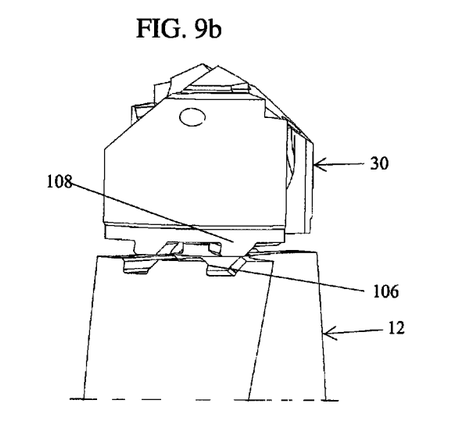
Figure 9C:
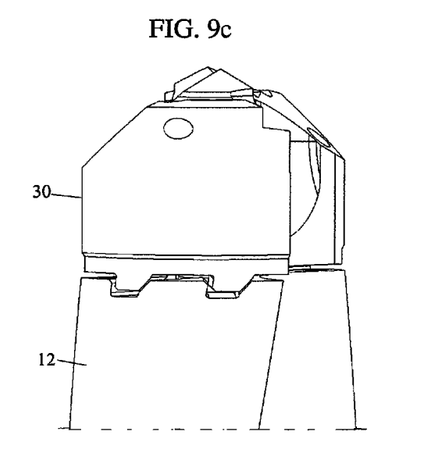
Figure 9D:
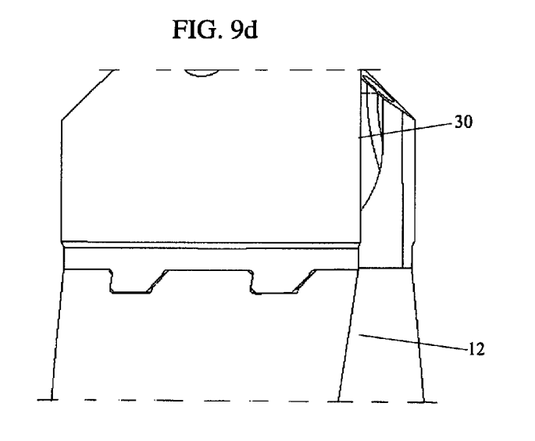

In this example, with reference to Figs A-9d, the dovetail protrusions 42 of the drill head 30 and the dovetail grooves 22 in the body 12 are formed in a rotational pattern about the center axis of the tool in a manner that first allows the drill head center guide post 33 to be inserted into the body center guide post hole 28 as seen in FIG. A. The drill head 30 may then be rotated about the axis of the center post 33, in the direction of tool rotation (clockwise), as seen in FIG. 9b. As the drill head 30 is rotated, the dovetail protrusions 42 of the drill head 30 engage with the dovetail grooves 22 on the body 12 as seen in FIG. 9c, and lock into place as in FIG. 9d.

Figure 10A:
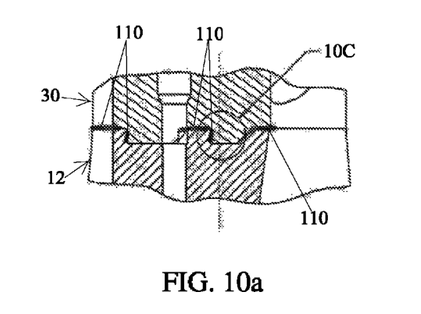
FIGS. 10a-10c show partial cross-sectional views of the connection between the drill head and holder body of this example of the drilling system.
Figure 10B:
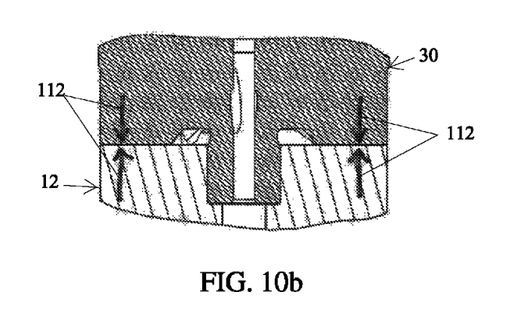
Figure 10C:
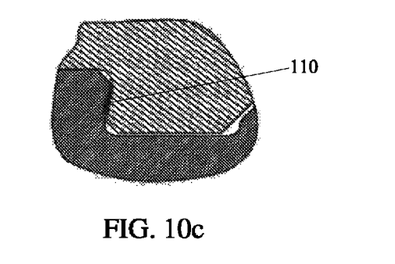

In the example, the connection between the body 12 and drill head 30 provides further distinct advantage. In a drilling process, lateral drilling forces have led to the use of screws and/or an insertable post or boss to attempt to counteract such lateral loading. Also, attempts to prevent tipping or rocking of a drill head against a holder body from lateral loading due to drilling forces has included putting these screw and/or bosses in bending. In such attempts, the position of these features relative to the point on the drill head where lateral loading is introduced increases the bending moment. In contrast, the present invention provides a connection between the body 12 and drill head 30 which effectively handles the lateral loading differently. The engaged surfaces 106 and 108 (see FIG. 9b) of the dovetail grooves 22 and protrusions 42 may be oriented at angles, such as 2° to 30°, or for performance, 5° to 20°, with an angle of 10° shown in the example. The angled surfaces allow any and all components of lateral loading to be opposed by at least two of these features. The first function of the angled surfaces is to translate the torque from the tool into axial motion, drawing the drill head 30 onto the seating surface of the holder body 12. Their second function is that when the angled surfaces are engaged, it will prevent tipping or rocking of the drill head 30 on the holder body 12. In FIGS. 10a-10c, there is shown the engaged surfaces of the drill head 30 and holder body 12 as well as the dovetail features with lines at 110. The opposing arrows 112 in the main cross sectional view show how these dovetail features create an effective clamp on each of the features with which they are engaged, so as to positively hold the drill head 30 onto the mating surface of the holder body 12. Further, because these features are symmetrical they create the effect of opposing wedge shapes which would not allow any degrees of freedom once assembled.

The center guide post 25 of the drill head 30 inserts into the corresponding center guide post hole 15 in the body 12. This feature acts as a positional guide ensuring that, when assembled, the drill head 30 and the body 12 share the same axis of rotation within set tolerances, and allows for proper alignment of the dovetail grooves and dovetail protrusions.

As described above the center guide post 33 and the mounting screws 34 only act as a means of guiding the assembly of the drill head 30 to the holder body 12. The purpose of the mounting screws is to ensure proper assembly of the drill head and body. Once tightened in place the drill head and body will be assembled and ready to be used to drill. The mounting screws carry no load during drilling because all of the load is translated through the drill head and body interface. Once the dovetail surfaces are engaged, the influence of the mounting screws and guide post are negligible. This keeps the center post 33 and mounting screws 34 from being loaded in bending and concentrates all of the opposing lateral loads at the immediate connection 100 interface.

Figure 11A:
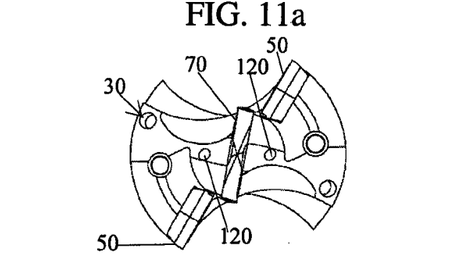
FIGS. 11a-11d show partial sectional views of the coolant supply systems of this example of the drilling system.
Figure 11B:
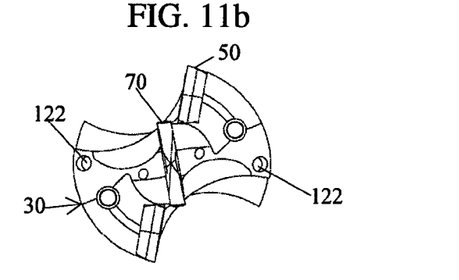
Figure 11C:
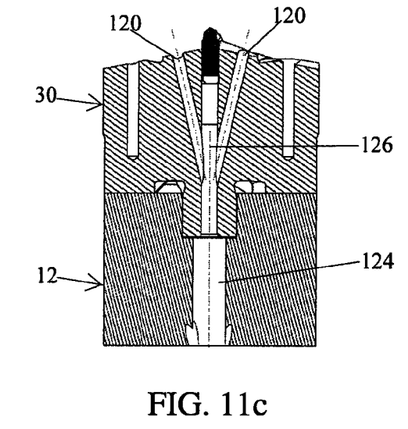

In this example, the drilling system may be designed to operate with through tool coolant. As seen in FIG. 11a and 11b, the drill head 30 may include four outlets, including two inner outlets 120 designed to direct a supply of coolant to the central drilling system 70 and two outer outlets 122 designed to direct a supply of coolant to the major diameter cutting inserts 50. A large central coolant hole 124 formed in the holder body 12 will carry the coolant from the machine tool, through the body 12, and towards the drill head 30. In this example, as seen in FIG. 11c, the arrows show the coolant that supplies the two inner outlets 120 will travel through a main central coolant channel 124 formed in the body 12, which breaks out into the center guide post hole 26. From there, the coolant travels into the drill head 30 through a central channel 126 in the bottom of the center guide post 33. The two inner outlets 120 are angled to intersect this main channel 126 in the drill head 30 and release the coolant near the central drilling system 70.

Figure 11D:
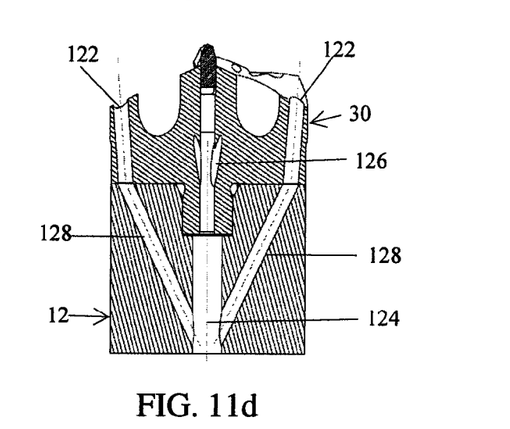

In FIG. 11d, the arrows show the coolant that supplies the two outer outlets 122 will travel through the main central coolant channel 124 of the holder body 12 towards the drill head 30. Two outlets 128 extend from the face of the body 12 and angle inward to intersect with the main coolant channel 124. The coolant will travel through these angled outlets 128 where they connect with the outer outlets 122 of the same diameter on the bottom seating surface of the drill head 30, such that the coolant is released near the outside diameter of the drill head 30 towards the major diameter cutting inserts 50. Other configurations to apply coolant at the locations of the cutting inserts 50 and 70 may be used.

Figure 12A:
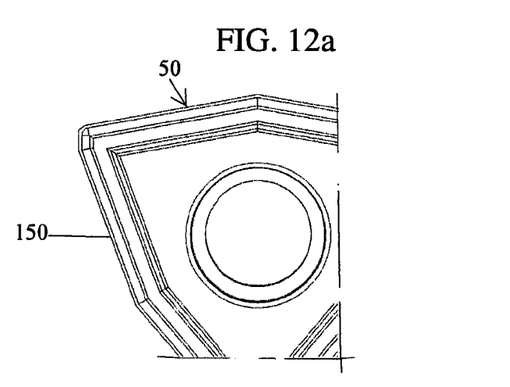
FIGS. 12a and 12b show partial elevational views of a cutting insert associated with the drilling system.
Figure 12B:
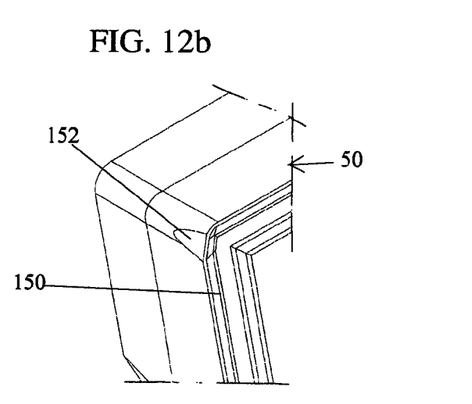

The major diameter cutting inserts 50 may be indexable IC inserts, such as shown in FIGS. 12a and 12b. In this example, trigon inserts are shown, having three cutting edges, and include a wiper 150, being a feature on the insert 50 that is formed on the part of the insert cutting the major OD. The wiper 150 is generally positioned to be vertical in line with the center axis of the hole being drilled. The wiper surface has a small amount of clearance 152 behind the cutting edge as seen in FIG. 12b. The wiper 150 avoids the formation of surface defects from the cutting edge having a single point of contact between the tool and the work piece, such as if a corner radius is used instead of the wiper 150. A single point contact can result in visible grooves in the surface finish of the hole, but also will not act to stabilize the tool. The wiper 150 allows the drill system to form a finished hole configuration with improved surface finish of the work piece, especially at tool break out. Additionally, the wiper 150 will provide stability to the tool at the point where the center drill exits the work piece. In the example shown, when the inserts 30 are set in a double effective configuration, there will be a wiper 150 cutting the major diameter on two sides of the tool, such as 180° apart from each other. These opposing wipers 150 will act as a margin for the tool as it breaks out of the work piece on through holes. If the inserts 30 are set up in a single effective configuration, with only one wiper 150 on the insert cutting the major diameter, a wear pad can be used on the drill head 30 to oppose the wiper 150 and provide the stability for exit on through holes.

For the central drilling system 70, a self-centering point geometry, such as on the AMEC T-A® blade and Gen3sys® replaceable tip drill of Allied Machine & Engineering Corp., provide a combination of clearance features on the point of the blade that greatly increases its centering capability. The positive web cutting edge geometry allows for free mechanical chip forming at the drill center. These features benefit the design by producing a hole that starts on center and retains an overall increased straightness throughout the depth of the hole. This drilling system may utilize either of these two as the central drilling system, or another suitable system.

The design of the system 10 allows for a greater amount of drill diameter range with each holder body 12 as well as having the flexibility of tailoring the central drilling system 40 geometry to the application. The connection between the drill head 30 and holder body 12 also provides a structurally robust design that offers superior stability to the drilling head 30 during a drilling operation. Any volatility experienced in the drilling environment is handled by the connection between the drill head 30 and holder body 12, and the stability of the drill head 30 in the present invention results in the cutting inserts 50 and 70 being supported to result in increased tool life and better hole quality. The connection between the body 12 and drill head 30 is also cost-effectively manufactured and makes assembly simple.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A drilling system, comprising:
   a holder body;
   a drill head attachable to the holder body, with the holder body having a first mating surface, and the drill head having a second mating surface;
   at least one outwardly extending portion and at least one inwardly extending portion formed on opposing first and second mating surfaces respectively, the at least one outwardly extending portion having a length and including a first surface extending at an obtuse angle relative to the mating surface, a second surface extending from the first surface a predetermined length, and a third surface extending from the second surface at an acute angle and back to the mating surface, with the at least one inwardly extending portion having corresponding first, second and third surfaces, and wherein the at least one inwardly extending portion allows the insertion of the at least one outwardly extending portion into it and allows rotation of the drill head relative to the holder body about the axis of the tool until the third surface of each engage one another, such that upon rotation of the tool, the engagement between the third surfaces causes the drill head to be drawn onto the mating surface of the holder body in a manner to lock the drill head to the holder body.

2. The drilling system of claim 1, wherein a plurality of outwardly and inwardly extending portions extend radially on opposing sides of a center guide post or guide hole formed in association with the mating surfaces.

3. The drilling system of claim 1, wherein a plurality of outwardly extending portions and inwardly extending portions are provided on each mating surface respectively.

4. The drilling system of claim 3, wherein the outwardly extending portions and inwardly extending portions cross about the center axis of the tool.

5. The drilling system of claim 3, wherein the outwardly extending portions and inwardly extending portions allow for the drilling head to be assembled at predetermined rotational increments.

6. The drilling system of claim 1, wherein the drilling head may be configured to provide a range of fixed diameters that fit on the same holder body.

7. The drilling system of claim 1, wherein the acute an angle is between 2° to 30°.

8. The drilling system of claim 1, further comprising mounting screws to guide the assembly of the drill head to the holder body, and wherein after assembly of the drill head to the holder body, the mounting screws carry substantially no load during drilling.

9. The drilling system of claim 1, further comprising at least one central drilling system and at least one cutting insert for cutting the major diameter of a hole.

10. The drilling system of claim 9, wherein a plurality of cutting inserts are provided for cutting the major diameter of a hole.

11. The drilling system of claim 9, further comprising a through tool coolant system including at least one inner outlet positioned to direct a supply of coolant to the central drilling system at least one outer outlet positioned to direct a supply of coolant to the major diameter cutting insert.

12. The drilling system of claim 10, further comprising a through tool coolant system including at least one inner outlet positioned to direct a supply of coolant to the central drilling system at least one outer outlet positioned to direct a supply of coolant to each of the major diameter cutting inserts.

13. The drilling system of claim 1, wherein the at least one outwardly extending portion and at least one inwardly extending portion are bounded by the periphery of the drill head or holder body.

14. The drilling system of claim 1, wherein the first surfaces are in clearance.

15. A drilling system for producing deep holes in a workpiece, comprising:
    a holder body;
    a drill head attachable to the holder body, with the holder body having a first mating surface, and the drill head having a second mating surface;
    at least first and second outwardly extending portions and first and second inwardly extending portions formed on opposing first and second mating surfaces respectively, and including a first surface extending at an obtuse angle relative to the mating surface, a second surface extending from the first surface, and a third surface extending from the second surface at an acute angle and back to the mating surface, with the at least one inwardly extending portion having corresponding first, second and third surfaces, and wherein the at least one inwardly extending portion allows the insertion of the at least one outwardly extending portion into it and allows rotation of the drill head relative to the holder body about the axis of the tool until the third surface of each engage one another, and wherein the at least first and second outward extending portions and inwardly extending portions cross one another on the mating surface.

16. The drilling system of claim 15, further comprising mounting screws to guide the assembly of the drill head to the holder body, and wherein after assembly of the drill head to the holder body, the mounting screws carry substantially no load during drilling.

17. The drilling system of claim 15, further comprising at least one central drilling system and a plurality of cutting inserts for cutting the major diameter of a hole.

18. The drilling system of claim 15, further comprising a through tool coolant system including at least one inner outlet positioned to direct a supply of coolant to the central portion of the drilling head and at least one outer outlet positioned to direct a supply of coolant to the outer portion of the drilling head.

19. The drilling system of claim 15, wherein the drilling head may be configured to provide a range of fixed diameters that fit on the same holder body.

20. The drilling system of claim 15, wherein the acute an angle is between 2° to 30°.

* * * * *